United States Patent Office 3,632,748
Patented Jan. 4, 1972

3,632,748
METHOD FOR IMPROVING WEIGHT GAINS AND REDUCING GROSS LESIONS IN CHICKENS EXPOSED TO MAREK'S DISEASE
Richard E. Bowen, Brandywine Township, Hancock County, and Walter J. Kleinschmidt, Lawrence Township, Marion County, Ind., assignors to Eli Lilly and Company, Indianapolis, Ind.
No Drawing. Filed June 6, 1969, Ser. No. 831,229
Int. Cl. A61k 21/00
U.S. Cl. 424—115                                6 Claims

ABSTRACT OF THE DISCLOSURE

Methods for improving weight gains and reducing processing plant condemnations in chickens exposed to Marek's disease comprising administration of statolon to chicks or chick embryos.

BACKGROUND OF THE INVENTION

Marek's disease is a debilitating disease which attacks avian species and is found throughout the world wherever chickens are present. The causative agent is thought to be a virus or viruses of the herpes type. The mode of infection is believed to be through the breathing or ingestion of the virus or by transmission from the hen via the fertile egg to the embryo. The incubation period for the disease is from four to six weeks. The disease includes all acute forms of avian leukosis that are characteristized by a proliferation of pleomorphic lymphocytes and plasma cells. The lesions can be found in the nervous system, the eyes, the viscera, the skeletal muscle, and the skin. Marek's disease syndrome is said by Burmester and Witter, An Outline of the Diseases of the Avian Leukosis Complex, Production Research Report No. 94, United States Department of Agriculture (USDA) (1966), to encompass such clinical conditions as fowl paralysis, range paralysis, polyneuritis, neurolymphomatosis gallinarum, visceral lymphomatosis, acute leukosis, ocular lymphomatosis and iritis. The early manifestations of the disease are apparent in such conditions as failure to gain weight, dehydration, and paralysis. The disease may result in an early or lingering death or, if the bird survives the acute phase of the disease, a regression of the symptoms may take place and the bird may recover. However, even recovered birds can contribute to substantial economic losses to the grower because they fall behind in the growth schedule. The economic loss to the poultry industry from Marek's disease is high. For example, it has been estimated that the incidence of Marek's disease in broiler flocks ranges up to 8 percent. In 1968, about 36 million broiler chickens damaged by Marek's disease were condemned in USDA-inspected processing plants. This figure represented about 48 percent of all condemnations reported in 1968 (USDA Statistical Reporting Service POW 2–1, Crop Reporting Board, Washington, D.C. 20250).

Present control procedure for Marek's disease are limited to maintenance of good hygiene and sanitation and to the genetic development of strains of disease-resistant birds. There are no known prophylactic or therapeutic methods available to protect chickens against the ravages of the disease or to cure the infection when it occurs. Therefore, the search for effective methods for controlling Marek's disease in chickens is a continuing one.

SUMMARY

It has now been discovered that the administration of statolon parenterally to viable embryos in the egg from the seventeenth day after the beginning of incubation until the time of hatching, or to chicks from the time of hatching until the seventh day after hatching has a prophylactic effect and is effective in improving the weight gains and reducing gross lesions in chickens exposed to Marek's disease. The statolon also can be introduced into the viable embryo by dipping the incubating egg into an aqueous solution thereof, whereby the statolon is absorbed from the solution into the egg.

DESCRIPTION OF THE PREFERRED EMBODIMENT

This invention relates to poultry husbandry. More particularly, this invention relates to methods for the use of prophylactic amounts of statolon to stimulate the natural resistance of chickens to Marek's disease.

Statolon is a substance produced during the growth of the organism Penicillium stoloniferum in a suitable fermentation medium containing carbohydrate, a nitrogen source, and mineral salts. The production, isolation, and purification of statolon are described with particularly in United States Pat. No. 3,108,047. Statolon is found to be present in the broth after the proliferate growth of Penicillium stoloniferum in an appropriate medium. During the early stages of the fermentation, the statolon is present in the mycelium and is released into the broth during the last 48 hours of a 120–hour fermentation cycle. Filtration of the fermentation mixture leaves the statolon in the broth, from which it is isolated and purified by conventional procedures. The active constituent of the purified product is now known to be a mycophage [L. F. Ellis and W. J. Kleinschmidt, Nature, 215, 649 (1967)].

In the useful processes of this invention, statolon can be injected either subcutaneously, intramuscularly, or intraperitoneally into the chicken from the time of hatching until the seventh day after hatching, or into the viable chick embryo from about the seventeenth day following the beginning of incubation until the living chicken leaves the egg. Alternatively, statolon can be introduced into the embryo simply by dipping the incubating egg into an aqueous solution of statolon from about the seventeenth day following the beginning of incubation until the time of hatching.

Chickens appear to have some natural resistance to Marek's disease, since not all chickens exposed to the disease contract the infection. Statolon appears to stimulate the natural resistance of the chicken, thereby aiding the bird to ward off the disease. It does not act directly on the virus or viruses believed to be involved in the ethiology of Marek's disease, nor does it act to immunize the chicken to Marek's disease by producing antibodies to the infection. Surprisingly, however, statolon, when employed in the manner described herein, significantly and economically improves weight gains and reduces gross lesions in chickens exposed to Marek's disease.

It has been found that, in the practice of this invention, a prophylactic dose of statolon is provided when from about 5 to about 30 mg. of statolon per chick are injected into a chick embryo or young chick or when an incubating egg is dipped in an aqueous solution comprising about 1 to about 10 percent (weight/volume) of statolon for about 10 to about 30 minutes.

In a preferred embodiment of this invention, statolon, in an amount of from about 5 to about 30 mg. per chick in an aqueous solution, is injected subcutaneously into young chicks on the first to seventh day after hatching. Alternatively, the statolon solution may be injected intramuscularly or intraperitoneally. A method of choice for stimulating the resistance of the chicken against the infection of Marek's disease comprises the subcutaneous injection of 10 mg. of statolon in 0.25 ml. of aqueous vehicle into one-day-old chicks. The aqueous vehicle can be either sterile water for injection, sterile purified water, sterile phosphate buffered (pH 5.0–7.5) solution, or sodium chloride injection, U.S.P. XVII (pH 4.5–7.0), preferably sterile water for injection.

In another embodiment of this invention, an effective amount of statolon can be administered by injection into the viable embryo from about the seventeenth day following the beginning of incubation until the live bird is hatched. Preferably, an aqueous solution of 10 mg. of statolon in 0.25 ml. of vehicle is injected through the egg shell into the embryo on the seventeenth or eighteenth day of incubation.

When the statolon is administered by injection, the required amount can be given as a single dose or in divided doses, provided that the total required does is given within the prescribed time period.

In still another embodiment of this invention, statolon can be introduced into the embryo in an effective amount by dipping the incubating egg in an aqueous medium containing from about 1 to about 10 percent (weight/volume) of the active agent for from about 10 to about 30 minutes during the period between about the seventeenth day following the beginning of incubation and the time of hatching. A method of choice for the egg-dipping process comprises submersing the incubating eggs in a 5-percent solution of statolon for about 20 minutes on the seventeenth or eighteenth day of incubation.

In the method comprising the injection of statolon, whether into the embryo or the young chick, the injection solution can be conveniently prepared by dissolving the statolon in an aqueous vehicle in a concentration of from about 5 to about 100 mg./ml., preferably about 40 mg./ml. Those skilled in the art will recognize that the exact concentration will be a function of the required effective dosage of statolon and the volume of solution that can be conveniently injected into the embryo or baby chick.

The statolon solution into which the incubating eggs are dipped is prepared by dissolving the substance in purified water in the desired concentration and adjusting the solution to about pH 7.0 as required.

This invention is further illustrated by the following examples:

Example 1

Ten milligrams of statolon were dissolved in 0.25 ml. of distilled water and injected intraperitoneally into one-day-old broiler chicks. The chicks were of two different strains and were held separate by strain for the duration of the test. Control birds, which received no statolon, were kept in the same facility. All chickens were housed in a building which was known to harbor Marek's disease virus and were fed the same diet. At the end of seven and one-half weeks, each bird was weighed, sacrificed, and necropsied for Marek's lesions. The birds from both strains which were treated with statolon gained 6 percent more weight than the untreated controls. None of the treated chickens showed the gross lesions of Marek's disease, while four of 180 control brids exhibited lesions. Table I gives the results of this test.

TABLE I

[Effect on Marek's disease infection of statolon injected intraperitoneally into one-day-old broiler chicks]

| Source (strain) of chickens | Number of birds in test | Statolon treatment | Average weight at 7½ weeks (grams) | Marek's disease | |
|---|---|---|---|---|---|
| | | | | Deaths | Necropsy lesions |
| A [1] | 98 | None [2] | 1056.1 | 0 | 4 of 98. |
| A | 67 | 10 mg. IP | 1121.5 | 0 | 0 of 67. |
| B [3] | 82 | None [2] | 1246.6 | 0 | 0 of 82. |
| B | 55 | 10 mg. IP | 1326.3 | 0 | 0 of 55. |

[1] A = Farm Bureau strain.
[2] Untreated controls.
[3] B = Conway strain.

Example 2

Four groups of four-day-old S13 strain leghorn chicks (Eli Lilly Station Leghorn Strain) were employed in this experiment. Each bird in the first group was treated with 3.75 mg. of statolon. Similarly, each bird in the second and third groups received 7.5 and 10 mg. of statolon respectively. At each dose level, the statolon was dissolved in 0.25 ml. of distilled water and injected intraperitoneally. A fourth group of birds, not treated with statolon, was maintained in the same facility. Eighteen hours following the statolon injection, the chicks in all four groups received a challenge dose of Marek's disease virus by intraperitoneal injection of 0.5 ml. of a $10^{-2}$ dilution of whole blood obtained from chickens known to have Marek's disease. The dilution of the blood was made with Hank's balanced salt soltuion, 1 liter of which has the following composition:

| Ingredient: | Grams/liters |
|---|---|
| NaCl | 8.0 |
| KCl | 0.4 |
| $Na_2HPO_4 \cdot 2H_2O$ | 0.06 |
| $KH_2PO_4$ | 0.06 |
| $MgSo_4 \cdot 7H_2O$ | 0.2 |
| $CaCl_2$ | 0.14 |
| $NaHCO_3$ | 0.35 |
| Glucose | 1.0 |
| Phenol Red | 0.01 |
| Water, distilled, q.s. | |

All chicks were fed the same diet during the test. The weight of each bird was determined weekly from the third through the ninth week of the test. The chickens in the groups receiving 7.5 or 10 mg. of statolon had statistically significantly greater ($p > .05$) weight gains than the control group and the group receiving 3.75 mg. of statolon. There was also a statistically significant ($p > .01$) reduction in the percent of chickens exhibiting Marek's disease lesions at necropsy in the groups receiving 7.5 or 10 mg. of statolon when compared with the control group. Table II shows the results of this test.

TABLE II

[Effect on Marek's disease infection of statolon injected intraperitoneally into four-day-old leghorn chicks]

| Number of birds in test | Statolon treatment | Average weight (grams) | | Average weight gain | Deaths | No. of chickens with lesions [1] (percent of total) |
|---|---|---|---|---|---|---|
| | | At 9 weeks | At 3 weeks | | | |
| 17 | 3.75 mg. IP | 343 | 57 | 286 | 10 | [2]11 (65) |
| 17 | 7.5 mg. IP | 425 | 68 | 357 | 8 | 8 (47) |
| 21 | 10.0 mg. IP | 470 | 63 | 417 | 8 | 11 (52) |
| 19 | None [3] | 329 | 59 | 270 | 13 | 16 (84) |

[1] Includes deaths.
[2] Not significant over controls.
[3] Infected controls.

Example 3

The effect of statolon in protecting chickens against Marek's disease when injected in a dose of 10 or 20 mg. per chick subcutaneously in the neck of one-day-old leghorn chicks (Eli Lilly Station Leghorn Strain S13) or when injected in a dose of 20 mg. into 18-day-old embryos was evaluated. On the second day after hatching, all chicks received a challenge comprising the intraperitoneal injection of 0.5 ml. of a $10^{-2}$ dilution of whole blood (prepared as described in Example 2) from chickens known to be infected with Marek's disease. A group of chicks not challenged with infected blood served as negative controls and were maintained in separate isolation facilities. The birds in all five groups were fed the same diet for the duration of the test. The weight of each chicken was determined weekly from the third through the ninth week of the test. At the end of the ninth week, the chickens were sacrificed and necropsied for gross Marek's disease lesions. The statolon-injected birds all gained significantly more than the infected controls and showed a lower incidence of mortality and lesion development. Table III gives the data from this test.

TABLE III

[Effect of statolon on Marek's disease infection]

| Number of birds in test at 3 weeks | Statolon treatment | Number deaths from 3rd through 9th week of tests | Number chickens with lesions | Average weight gain 3rd through 9th week (grams) |
|---|---|---|---|---|
| 37 | 10 mg. SC | 12 | 8 | 217 |
| 33 | 20 mg. SC | 7 | 5 | 235 |
| 21 | 20 mg.[3] | 8 | 9 | 222 |
| 33 | None [1] | 15 | 11 | 143 |
| 16 | None [2] | 0 | 0 | 474 |

[1] Infected controls.
[2] Noninfected controls.
[3] Into 18-day-old embryo.

Example 4

A solution of 10 mg. of statolon in 0.25 ml. of distilled water was injected intraperitoneally into four-day-old leghorn chicks of the Smithermann strain. Two similar but untreated groups of chicks were assigned to the test as controls. The group of chicks treated with statolon and one of the untreated groups were maintained in the same facility, and each chick was challenged on the fifth day after hatching with a 0.5-ml. dose of a $10^{-2}$ dilution of whole blood (prepared as described in Example 2) from chickens known to be infected with Marek's disease. The chicks in the third group were maintained in a separate isolation room and served as negative controls, getting neither statolon nor the Marek's disease challenge. All chicks received the same diet during the test. At the end of nine weeks, the chickens were weighed, sacrificed, and necropsied for Marek's disease lesions. The statolon-treated birds weighed 29 percent more, on the average, than the surviving infected controls at the end of the test. Table IV summarizes this test.

TABLE IV

[Effect on Marek's disease infection of statolon injected intraperitoneally into four-day-old leghorn chicks]

| Number of birds in test | Statolon treatment | Deaths | Number chickens with lesions | Average weight of chickens at 9 weeks (grams) |
|---|---|---|---|---|
| 18 | 10 mg. IP | 0 | 0 | 898 |
| 20 | None [1] | 0 | 0 | 844 |
| 19 | None [2] | 6 | 2 | 694 |

[1] Noninfected controls.
[2] Infected controls.

What is claimed is:

1. The method of improving weight gains and reducing gross lesions in chickens exposed to Marek's disease which comprises administering parenterally a prophylactic dose of statolon to chick embryos or young chicks from about the seventeenth day following the beginning of incubation until the time of hatching, or dipping incubated eggs in an aqueous medium containing statolon from the seventeenth day of incubation until the time of hatching.

2. The method of claim 1 wherein the statolon is administered parenterally in a single or divided dose in a total amount of from about 5 to about 30 mg. per chick from about the time of hatching until about seven days after hatching.

3. The method of claim 2 wherein the required amount of statolon is administered in a single dose.

4. The method of claim 2 wherein the required amount of statolon is administered in divided doses.

5. The method of claim 1 wherein the statolon is injected into the chick embryo in a single dose of from about 5 to about 30 mg. per embryo from about the seventeenth day following the beginning of incubation until the time of the hatching.

6. The method of claim 1 which comprises dipping incubating eggs in an aqueous medium comprising from about 1.0 to about 10.0 percent (weight/volume) of statolon for from about 10 to about 30 minutes during the period between about the seventeenth day of incubation until the time of hatching.

References Cited

Banks et al. Chem. Abst. vol. 69 (1968) p. 17128V.
Biggs—Vet. Bull. vol. 38 (1968) p. 2361.
Churchill—Vet. Bull. vol. 38 (1968) p. 247.
Pindak et al. Chem. Abst. vol. 67 (1967) p. 89503V.
Kleinschmidt et al. Chem. Abst. vol. 58, p. 1304h and 1305a.
Kleinschmidt et al. Chem. Abst. vol. 62 (1965) p. 3271h.

SAM ROSEN, Primary Examiner